C. HAWES, G. A. MATHYS & S. N. CRAWHALL.
MACHINE FOR CUTTING VEGETABLES.
APPLICATION FILED JUNE 7, 1917.
1,281,964.
Patented Oct. 15, 1918.
2 SHEETS—SHEET 1.
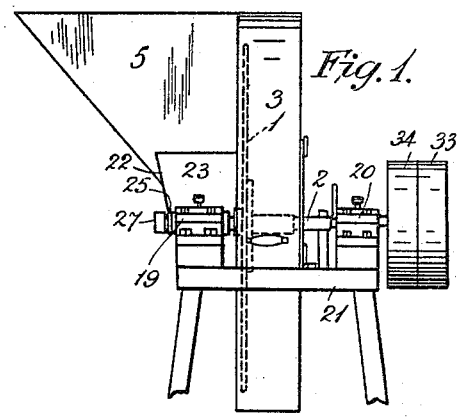
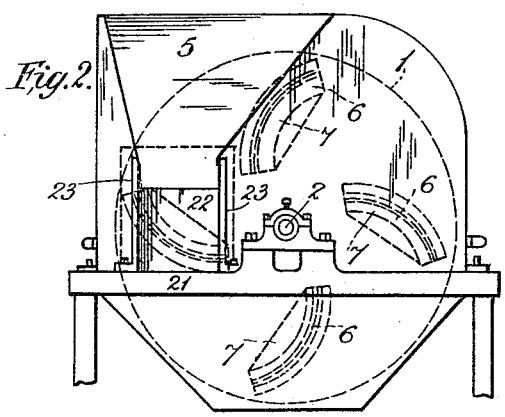
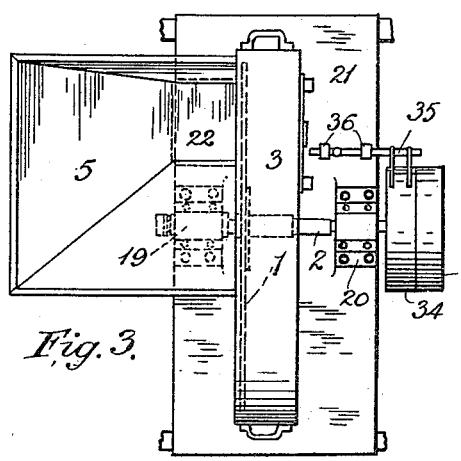
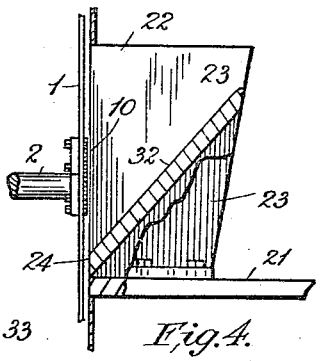
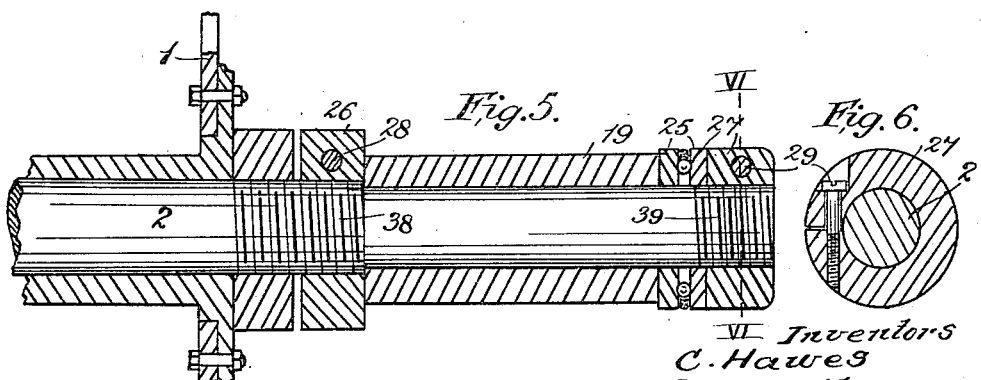
Inventors
C. Hawes
G. A. Mathys
S. N. Crawhall
by his Atty.

C. HAWES, G. A. MATHYS & S. N. CRAWHALL.
MACHINE FOR CUTTING VEGETABLES.
APPLICATION FILED JUNE 7, 1917.
1,281,964.
Patented Oct. 15, 1918.
2 SHEETS—SHEET 2.
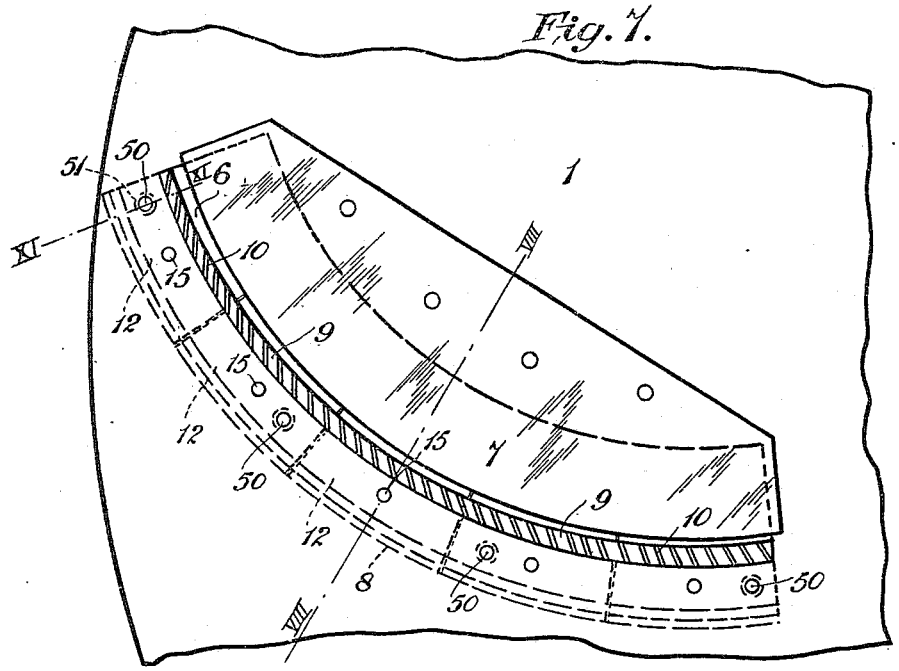
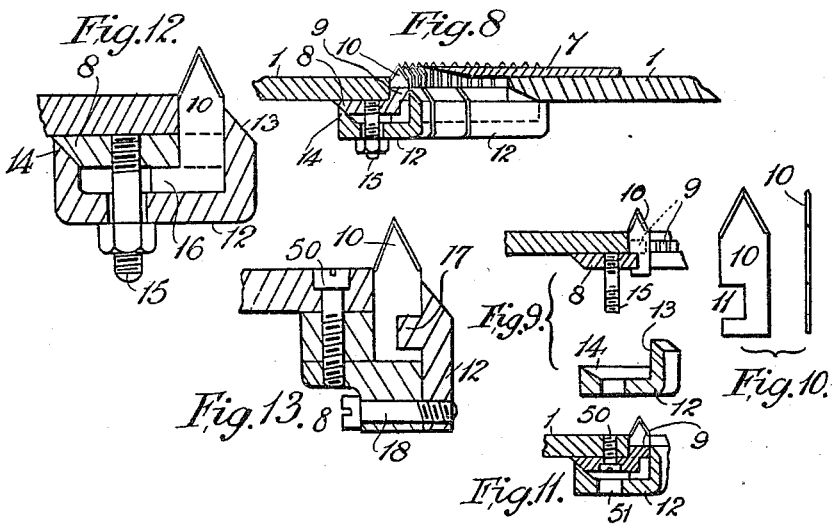
Inventors
C. Hawes
G. A Mathys
S. N. Crawhall
By Jno. Imrie Atty

UNITED STATES PATENT OFFICE.

CHARLES HAWES, GEORGE ANDREW MATHYS, AND SURTEES NEWTON CRAWHALL, OF LONDON, ENGLAND; SAID MATHYS AND SAID CRAWHALL ASSIGNORS TO SAID HAWES.

MACHINE FOR CUTTING VEGETABLES.

1,281,964.	Specification of Letters Patent.	Patented Oct. 15, 1918.

Application filed June 7, 1917. Serial No. 173,350.

*To all whom it may concern:*

Be it known that we, CHARLES HAWES, GEORGE ANDREW MATHYS, and SURTEES NEWTON CRAWHALL, all subjects of the King of Great Britain, all residing at London, England, have invented certain new and useful Improvements in Machines for Cutting Vegetables, of which the following is a specification.

This invention relates to improvements in machines for cutting vegetables into thin pieces which machines sometimes comprise a disk fitted with slicing knives rotating across the throat of a hopper and sometimes also have a disk provided with large slicing knives and a large number of small shredding blades arranged in slotted holders adjacent to the knives whereby in the rotation of the disk the vegetables, such as potatoes, swedes, carrots or the like, are first scored deeply by the shredding blades and the scored portions are then sliced off by the slicing knives so that shreds or thin fingers are formed.

The object of the present invention is to enable a machine of this kind to be constructed by which the vegetables will be fed and held up to the disk automatically so as to insure a steady uniform action without bruising or pulping, to enable the slicing knives, or the shredding blades and the slicing knives to be accurately adjusted relatively to the hopper throat, to insure uniformity of action and to prevent the delivery of partly or non-sliced, or non-shredded vegetable, and further to enable damaged blades to be easily and rapidly removed and replaced by new blades with a minimum of delay whereby a high efficiency of the machine as regards quality of shredded product and rate of out-put can be maintained.

In the accompanying drawings,

Figures 1, 2 and 3 are respectively a side elevation, a front elevation and a plan of one form of machine embodying the invention.

Fig. 4 is a side view partly in section showing part of the rotary disk and the hopper throat.

Fig. 5 is a sectional view of part of the shaft for the disk and the means for adjusting the disk, Fig. 6 being a cross section on VI—VI Fig. 5.

Fig. 7 is a front elevation of part of the disk showing one slicing knife and a corresponding set of shredding blades.

Fig. 8 is a cross section on the line VIII—VIII Fig. 5.

Fig. 9 is a similar view illustrating one blade in position and a clamping plate detached.

Fig. 10 shows a blade detached and on a larger scale.

Fig. 11 is a cross section on XI—XI Fig. 7.

Figs. 12 and 13 are cross sections of modified forms of holder, and clamping plates.

In one form a cast iron disk 1 is mounted on a horizontal spindle 2 so as to run truly thereon. The spindle 2 is mounted in bearings 19, 20, on a firm support such as a cast iron table 21. A cast iron throat piece 22 forming the delivery throat of a hopper 5 is firmly secured by bolts or screws to the table 21, so as to face the disk 1 at one side of the spindle 2. The throat piece 22 is preferably rendered rigid by casting webs at its sides 23. It is preferably machined across the delivery edge 24, and this machined edge is set accurately parallel to the disk 1. Any suitable form of hopper can be firmly or detachably secured to the throat piece. The throat piece 22 has a sharply inclined chute 32 whereby the vegetables are fed to the disk and are held firmly so that they do not rebound so that pulping or bruising is avoided.

The disk is provided with slicing knives 7 and with shredding blades 10. The spindle 2 is mounted in its bearings 19, 20, so as to permit of a certain degree of axial movement in order that the disk 1 can be set or adjusted accurately relatively to the throat piece 22. In one form the spindle is provided with ball thrust washers 25 and has screw threaded portions 38, 39, to receive adjustable split screwed collars 26, 27, provided with clamping screws 28, 29, so that when the collars are slackened they can be adjusted on the spindle to be moved more or less axially and then tightened to hold the spindle in the adjusted position relatively to the bearings and therefore adjust the disk 1, relatively to the hopper throat piece 22.

The provision of a rigid throat piece and means for permitting accurate adjustment of the disk relatively thereto, enables the machine to work efficiently and clean cut shreds to be obtained and avoids thin slices passing through without being shredded.

The shaft 2 may be driven by any usual means. It may be fitted with fast and loose pulleys 33, 34, and a belt striker 35 may be fitted to slide on guides 36.

The disk 1 has a number of gaps 6. Adjacent to the edge of each gap 6 a slicing knife 7 is secured, this knife preferably having a curved cutting edge as is adopted in well known forms of turnip slicing machines, so as to give a so called draw-cut. Adjacent to the opposite edge of each gap a curved holding plate 8 is secured. The holding plate 8 is curved to conform approximately to the cutting edge of the slicing knife 7 and slotted at one side or edge to receive the shredding blades 10. The slots are preferably arranged tangentially to the circular paths followed by the blades in the rotation of the disks so that the blades present their edges fairly to the vegetable being cut. The slotted edge of the holding plate is preferably in the form of a ridge 9 on the face of and partly overhanging the edge proper of the holding plate 8. The ridge 9 may be of gradually increasing width to accommodate the blades when they are arranged tangentially. Each blade 10 has a notch 11 cut into one side and shaped to conform to the portion of the holding plate 8 at the rear of the slotted ridge 9. The plate 8 is preferably of rectangular cross section the notch being of similar shape. When a blade is inserted in a slot in the ridge it also fits into the holding plate 8, the rear part of which enters and fills the notch 11 in the blade. The ridge 9 offers lateral resistance, the edge proper of the holding plate offers resistance edgewise of the blade, and the rear face of the holding plate, in contact with one side of the notch, offers resistance to tilting movement. The notch 11 may be of such width that the blade when in proper position projects slightly beyond the edge of the holding plate 8, and in order to clamp the blades 10 firmly in position a clamping plate 12 is screwed, bolted or otherwise tightened so as to press against the edges of the blades.

It is also desirable to clamp the blades 10 against the rear of the holding plate 8 by a similar clamping plate. These two plates are preferably formed in one piece so that both clamping actions are performed simultaneously and by the same bolts, screws, or the like. For instance, as shown in Figs. 7 to 12, a clamping plate 12, of channel section is adapted to press with one side or flange 13 against the edges of the blades, with the bottom against the rear edges or ends of the blades, and with the other side 14 against the outer edge of the holding plate 8. This side of the clamping plate and the co-acting edge of the holding plate are beveled, so that when the clamping plate is tightened by suitable means such as nuts on studs 15 passing through it and screwed conveniently into the holding plate 8, there is a combined forward and lateral pressure applied to the blades.

The clamping plates 12 are preferably made in short lengths or segments to allow for any slight irregularity of fitting and also to minimize the time and trouble necessary for the removal and renewal of a blade, as only the segment in the locality of the damaged blade need be removed. When the clamping plate or segment thereof is removed, the damaged blade can be extracted by a pair of pliers or otherwise, a new blade inserted and the clamping plate replaced and tightened up. This operation can be effected by an unskilled person and the machine need be stopped only for a very short time as the blades may be made of a standard size and pattern and a number of spare blades can be kept in stock near the machine. It also enables efficiency in operation to be maintained as the blades can be readily removed when blunt and replaced by new and sharp blades, and the maintenance of the proper number of good blades insures uniformity of shredding. These advantages are very important when a shredding machine forms part of an organized plant. The casing or guard 3 surrounding the disk is removable and may be fitted with a door to permit easy access to the rear of the disk to which the blade holders are secured.

The holding plates 8 are preferably detachably secured to the disk by screws 50 which permit of the holding plates 8 being removed to facilitate periodical washing or to enable the machine to be used for slicing only without necessitating the individual removal of the shredding blades 10 as the holding plates 8 with the blades 10 and their clamping plates can then be removed intact as the screws 50 are accessible through holes 51 in the clamping plates.

In another form the blades 10 have projecting portions 16, Fig. 12, to engage behind the holding plate 8 instead of being notched, while in a further mode as illustrated by Fig. 13 the clamping plate 12 has a ridge 17 entering notches in the blades, the clamping plate being secured by bolts or screws 18 to the holding plate 8.

We claim:—

1. A vegetable slicing and shredding machine comprising a rotary disk, a horizontal shaft for said disk, bearings for said shaft, a hopper provided with a throat and disposed on one side of said shaft, the face of the throat of the hopper being located adjacent said disk, and means for adjusting said disk relatively to said throat consisting of two screw-threaded portions on the aforesaid shaft one on each side of one of the aforesaid bearings, screw-threaded collars on said screw-threaded portions, and means for securing said collars in positions of adjustment.

2. A vegetable slicing and shredding machine comprising a rotary disk, a horizontal shaft for said disk, bearings for said shaft, a hopper throat disposed on one side of said shaft, the throat of the hopper having its face adjacent said disk parallel thereto, and means for adjusting said disk relatively to said face consisting of two screw-threaded portions on the aforesaid shaft one on each side of one of the aforesaid bearings, screw-threaded split collars on said screw-threaded portions, clamping screws for said collars and a ball-thrust-washer between one of said collars and the adjacent bearing.

3. A vegetable slicing and shredding machine comprising a rotary disk having slicing knives, slotted holders secured to said disk, independent shredding blades in said holders, clamping plates engaging with said blades at their bottom and outside edges and means for detachably securing said clamping plates in position, said holders and clamping plates having interengaging beveled edges, whereby clamping pressure is applied simultaneously at the bottom and outside edges of said blades, substantially as and for the purpose hereinbefore set forth.

4. In a vegetable slicing and shredding machine comprising a rotary disk, having gaps therein, a slicing knife secured to said disk adjacent to one edge of each gap, a holder secured to said disk adjacent to the opposite edge of each gap, said holder having a slotted ridge, independent shredding blades inserted in the slots of said ridge, said blades having recesses to receive the adjacent edge of said holder, a plurality of clamping plates adapted to engage with the ends of said blades and having flanges for engagement with the outer edges of said blades, and securing means for said clamping plates, substantially as and for the purpose hereinbefore set forth.

5. In a vegetable slicing and shredding machine comprising a rotary disk, having gaps therein, a curved slicing knife secured to said disk adjacent to one edge of each gap, a curved holder secured to said disk adjacent to the opposite edge of each gap, said holder having a curved slotted ridge the slots in said ridge being tangential to the center of rotation of said disk, independent blades inserted in said slots, and removable clamping plates for holding said blades in said slots, substantially as and for the purpose hereinbefore set forth.

In testimony whereof we have signed our names to this specification in the presence of two subscribing witnesses.

CHARLES HAWES.
GEORGE ANDREW MATHYS.
SURTEES NEWTON CRAWHALL.

Witnesses:
J. JOHN MAXWEL,
O. W. MATHYS.

Copies of this patent may be obtained for five cents each, by addressing the "Commissioner of Patents, Washington, D. C."